(No Model.)

L. B. GIBSON.
MOTOR FOR STREET CARS.

No. 384,147. Patented June 5, 1888.

WITNESSES:
Chas. S. Sturtevant.
F. L. Middleton.

INVENTOR,
Lucius B. Gibson,
BY Ellis Spear.
ATTORNEY.

UNITED STATES PATENT OFFICE.

LUCIUS B. GIBSON, OF PUEBLO, COLORADO.

MOTOR FOR STREET-CARS.

SPECIFICATION forming part of Letters Patent No. 384,147, dated June 5, 1888.

Application filed April 2, 1888. Serial No. 269,393. (No model.)

*To all whom it may concern:*

Be it known that I, LUCIUS B. GIBSON, of Pueblo, in the county of Pueblo and State of Colorado, have invented a new and useful Improvement in Motors for Street-Cars and Like Vehicles; and I do hereby declare that the following is a full, clear, and exact description of the same.

My present invention embodies the same principle of construction and operation as that shown in an application of even date herewith, the details of construction being different in the present case, including the substitution of sprocket wheels and chains in lieu of the cone-pulleys of the application aforesaid, with other changes incident to this main change from the structure shown in that application.

The invention, as hereinafter described, consists of a source of power, a main driving-shaft, a supplemental shaft in connection with the car-axle, and connections between the main and supplemental shafts consisting of sprocket-wheels or friction-pulleys loosely mounted on the two shafts opposite each other, varying in size and reversed in position, and connected by sprocket-chains, ropes, or belts with friction clutches or blocks on the shafts adapted to hold the loose wheels tight to the shafts, and thus transmit the power.

The invention also includes means for making the wheels tight to the shafts and means for adjusting the supplemental shaft to interrupt the transmission of power to the car-axle, and, finally, means for changing the direction of movement of the car.

Figure 1:
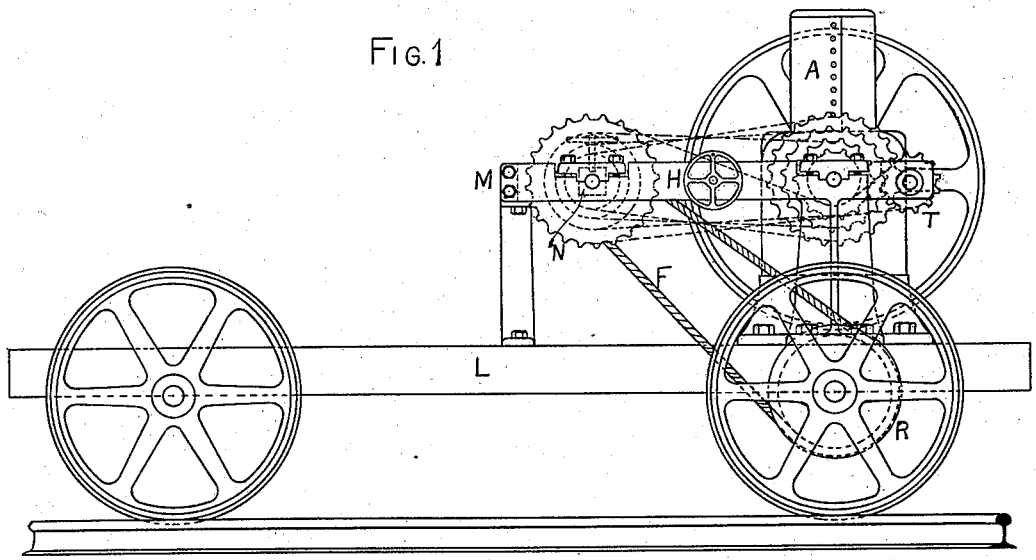
Figure 2:
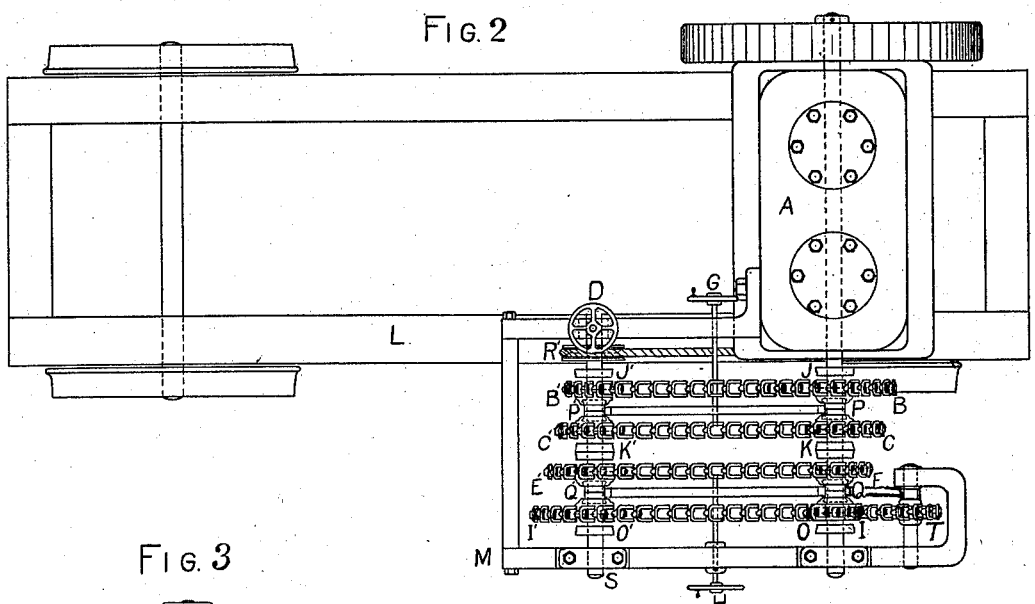
Figure 3:
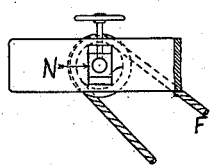

In the drawings, Figure 1 is a side elevation of my improved apparatus, and Fig. 2 a plan view of the same. Fig. 3 is a detail view.

In the figures the car-frame L, the source of power, A, the main and supplemental shafts O and S, and the connection from the supplemental shaft to the car-axle are all precisely like the same parts in my application hereinbefore referred to, with the exception of the means on the shafts for transmitting the power from the main shaft.

Instead of the friction cone-shaped drums shown in said application, I place upon the main shaft sprocket-wheels B C E I, differing in diameter and mounted loosely upon said shaft. On the supplemental shaft I place similar sprocket-wheels, also mounted loosely, but arranged in reverse order as to the size of the wheels from those on the main shaft. Each sprocket-wheel is provided with a recess in its face on each side adapted to a nut or disk fixed on the shaft alongside of each wheel.

Between the sprocket-wheels B and C on the main shaft and B' and C' on the supplemental shaft I place loose collars P P', connected by a rod, *a*, and between the wheels E and I and E' and I' similar collars are placed similarly connected. The friction blocks or disks are shown at J and O on one shaft and J' and O' on the other shaft, with double blocks or disks between the wheels C and E and C' and E'.

The different sizes of wheels enables the operator to run the car at varying rates of speed, and when he has determined this rate he shifts one of the rods *a*, which, through its collars, slides corresponding wheels on each shaft into engagement with the fixed friction blocks or disks, thus causing the wheels to revolve with the revolution of the main shaft, and to transmit the motion of this shaft to the supplemental shaft, and from thence to the axle to propel the car. An operating-rod terminating in a handle, G, serves to shift the wheels B C and B' C' into or out of engagement with the friction blocks or disks. A similar rod and wheel, H, operate the other rod to engage the other wheels.

It will be understood that, instead of sprocket-wheels, friction wheels or pulleys may be used, and ordinary rope or belts for connecting the wheels or pulleys. Instead of the blocks or disks for connecting the loose wheels with the shafts, a friction-disk such as that shown in Fig. 4 may be used.

In order to reverse the movement of the car, I support an idle sprocket-wheel, T, from a bracket, *b*, and pass the sprocket-chain beneath instead of around the wheel I, as shown more clearly in Fig. 1, and thence around the idler, thus reversing the motion of the car when the wheel I is thrown into engagement. A rope or chain, F, passes from the pulley R' on the supplemental shaft to a pulley fast to the car-axle. One end of the supplemental shaft is supported in a socket or swivel and the opposite end in an adjustable boxing, as shown in Fig. 3. A hand-wheel, D, controls the movement of this end of the shaft, and the same may be vertically adjusted to tighten or slacken the rope F, and thus interrupt the transmission of power.

Having thus described my invention, what I claim is—

1. In combination, a source of power, a main driving-shaft, a supplemental shaft, a driving-connection with the car-axle, and a series of loosely-mounted sprocket-wheels varying in size on the two shafts placed opposite each other, but in reversed position, whereby the speed of the car may be varied, fixed blocks or disks on the shafts for causing the sprocket-wheels to revolve with the shaft, and shifting devices for throwing the wheels into and out of fixed connection therewith.

2. In combination, a source of power, a main driving-shaft, sprocket-wheels mounted loosely thereon, a fixed connection with the shaft adapted to engage the loose wheels, a supplemental shaft having like loose wheels, and means for connecting them with the shaft, sprocket-chains between the wheels, and an idler-sprocket, T, for receiving one of the chains placed in rear of the sprocket-wheel on the main shaft, the chain passing beneath the said sprocket to the idler, whereby when the sprocket is connected with the shaft a reversed motion is given the car, substantially as described.

3. In combination, a source of power, a main driving-shaft, loose wheels thereon, a supplemental shaft pivotally supported at one end and having means of adjustment at the other, loose wheels on said shaft, means for connecting said wheels with the shafts, chains or ropes between the wheels, and a connection with the car-axle, substantially as described.

In testimony whereof I have signed my name to this specification in the presence of two subscribing witnesses.

LUCIUS B. GIBSON.

Witnesses:
D. J. SIPE,
E. H. MARTIN.